US005382996A

United States Patent [19]
Kadohara

[11] Patent Number: 5,382,996
[45] Date of Patent: Jan. 17, 1995

[54] AUTO-FOCUS APPARATUS HAVING DIFFERENT LEVELS FOR EMITTING FOCUSING LIGHT AND FOR INHIBITING A FOCUS OPERATION

[75] Inventor: Terutake Kadohara, Yokohama, Japan

[73] Assignee: Canon Kabushiki Kaisha, Tokyo, Japan

[21] Appl. No.: 107,036

[22] Filed: Aug. 17, 1993

Related U.S. Application Data

[63] Continuation of Ser. No. 731,532, Jul. 17, 1991, abandoned.

[30] Foreign Application Priority Data

Jul. 20, 1990 [JP] Japan .................. 2-192675

[51] Int. Cl.$^6$ .................. G03B 13/36
[52] U.S. Cl. .................. 354/403
[58] Field of Search .................. 354/403

[56] References Cited

U.S. PATENT DOCUMENTS

| | | | |
|---|---|---|---|
| 4,618,235 | 10/1986 | Ishida et al. | 354/403 |
| 4,801,962 | 1/1989 | Akashi | 354/403 X |
| 4,935,613 | 6/1990 | Ishiguro et al. | 354/403 X |
| 4,980,716 | 12/1990 | Suzuki et al. | 354/403 |
| 4,992,817 | 2/1991 | Aoyama et al. | 354/403 |
| 5,008,695 | 4/1991 | Nagoka et al. | 354/403 |
| 5,148,211 | 9/1990 | Kotani et al. | 354/403 |

Primary Examiner—J. K. Han
Attorney, Agent, or Firm—Fitzpatrick, Cella, Harper & Scinto

[57] ABSTRACT

An auto-focus apparatus which has different levels for determining whether to emit an auxiliary focusing light and whether to inhibit the focusing operation is operative with a light-receiving sensor for receiving light reflected by the object and performs a focusing operation on the basis of the output from the sensor. A processing circuit is provided for executing signal processing on the basis of the output from the sensor. The processing circuit outputs an instruction signal for activating a focusing light projector when a characteristic value for focusing (e.g., contrast) based on the output from the sensor falls within a first range. The processing circuit detects the output from the sensor in a state where light is being projected by the light projector. The processing circuit inhibits the focusing operation based on the output from the sensor when the characteristic value falls within a second range which is within the first range.

18 Claims, 7 Drawing Sheets

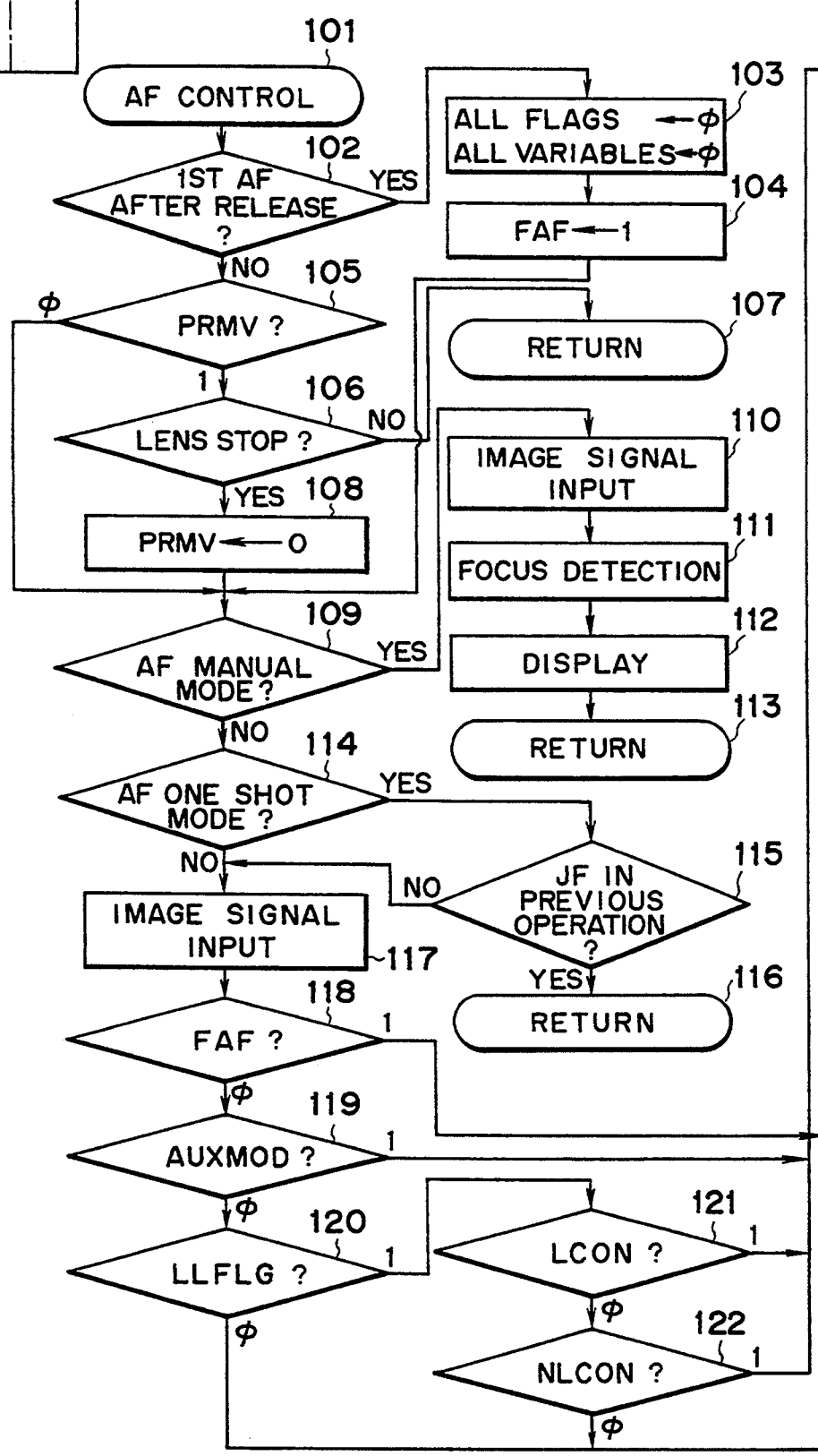

AUTO-FOCUS APPARATUS HAVING DIFFERENT LEVELS FOR EMITTING FOCUSING LIGHT AND FOR INHIBITING A FOCUS OPERATION

This application is a continuation of application Ser. No. 07/731,532 filed Jul. 17, 1991, now abandoned.

BACKGROUND OF THE INVENTION

1. Field of the Invention

The present invention relates to a focus detection apparatus for, e.g., a camera and, more particularly, to an auto-focus apparatus for performing focus detection using an auxiliary light source.

2. Related Background Art

Conventionally, in an auto-focus apparatus for performing focus detection using an image signal accumulation sensor such as, e.g., a CCD, and driving a lens based on a focus detection result, precise focus detection is disabled in a low-contrast state. For this reason, in a low-contrast state, a method of projecting auxiliary light onto an object, and performing focus detection is adopted.

However, conventionally, the low-contrast determination level is set at a boundary level allowing focus detection without auxiliary light. For this reason, focus detection can be performed without auxiliary light in a slightly higher contrast state than that at the boundary level. In such a contrast state, focus detection precision is low, and auxiliary light should be projected in such a contrast state to attain focus detection with high precision. Therefore, if the auxiliary light projection determination level is set at a determination level (4×LCNUM) higher than the boundary determination level (LCNUM) allowing focus detection without auxiliary light, the above-mentioned problem can be solved.

On the other hand, in an apparatus of this type, a focus detection enable/disable determination level is caused to coincide with the auxiliary light projection determination level since auxiliary light is projected when the focus detection is disabled. Therefore, when the auxiliary light projection determination level is set to be 4×LCNUM, as described above, the focus detection enable/disable level is also set to be 4×LCNUM. Therefore, when a contrast state as a result of projection of auxiliary light corresponds to a contrast between LCNUM and 4×LCNUM, it is determined that the focus detection is disabled although a focusing operation can be performed, and the focusing operation is inhibited.

SUMMARY OF THE INVENTION

One aspect of the application has been made in consideration of the above situation, and has as its object to provide an auto-focus apparatus which sets an auxiliary light projection determination level to be higher than a focus detection enable/disable determination level, thereby performing focus detection with high precision, and performing a precise focusing operation.

According to one aspect of the application, in order to achieve the above object, there is provided a camera system wherein when a characteristic value based on a sensor output (such as a contrast and representing a possibility of focus detection) is lower than a predetermined first level, projection means is operated, and when the characteristic value based on the sensor output in a light projection state by the projection means is lower than a second level lower than the predetermined first level, a focusing operation based on the sensor output is inhibited.

Other objects of the present invention will be apparent from the following description of the embodiment taken in conjunction with the accompanying drawings.

BRIEF DESCRIPTION OF THE DRAWINGS

FIGS. 2, 3A, 3B, 4A, 4B, and 4C are flow charts showing a program for explaining an operation of the embodiment shown in FIG. 1.

DESCRIPTION OF THE PREFERRED EMBODIMENT

An embodiment of the present invention will be described hereinafter.

Figure 1:
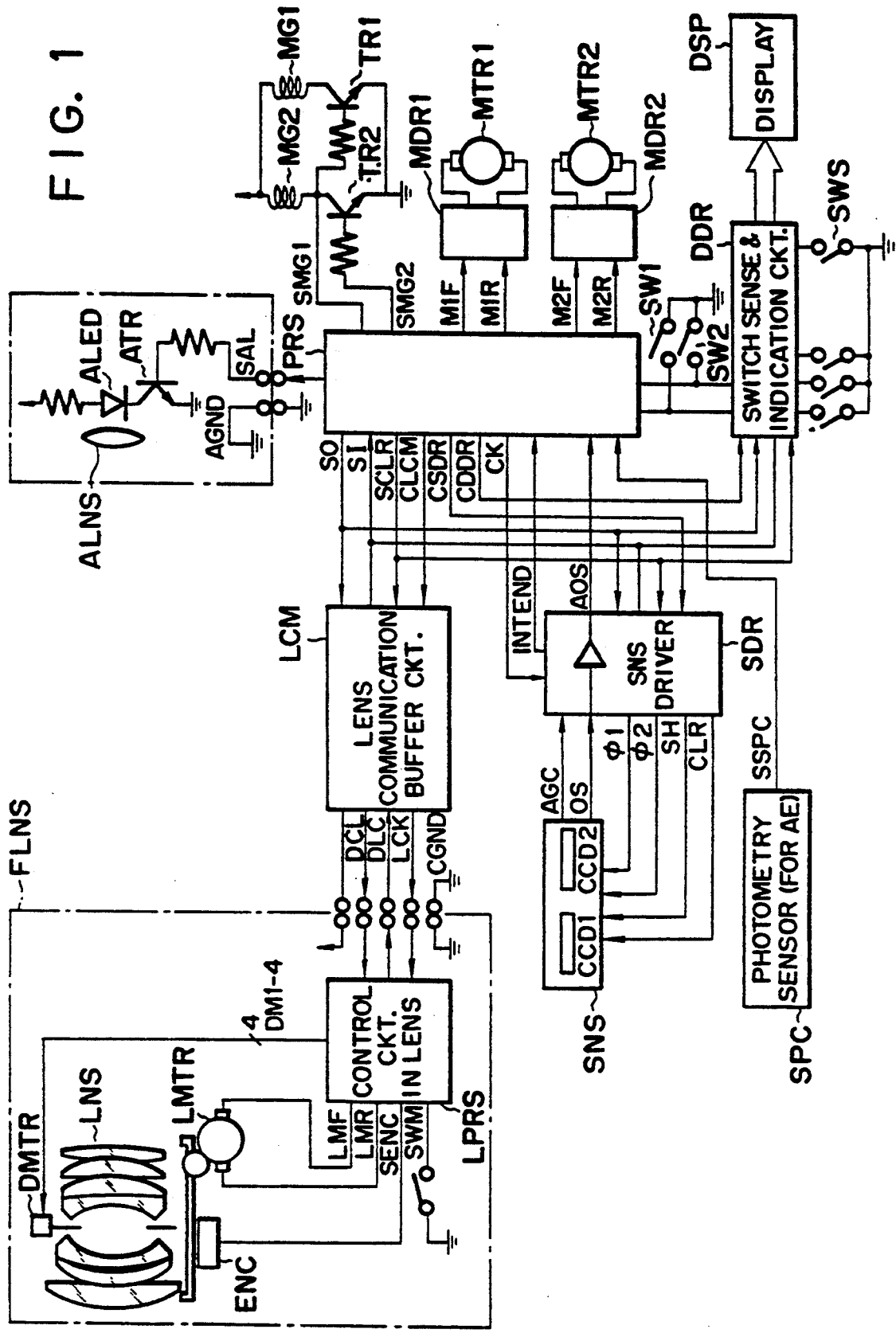
FIG. 1 is a circuit diagram showing an embodiment of a focus detection apparatus according to the present invention.

FIG. 1 is a circuit diagram showing an embodiment of a camera comprising an auto-focus apparatus according to the present invention.

In FIG. 1, a camera controller PRS comprises a one-chip microcomputer including a CPU (central processing unit), a ROM, a RAM, and an A/D conversion function. The microcomputer PRS executes a series of camera operations such as an auto-exposure (AE) control function, an auto-focusing (AF) function, a film windup/rewind operation, and the like in accordance with a camera sequence program stored in the ROM. For this purpose, the controller PRS communicates with peripheral circuits in a camera main body, and a control circuit in a lens using communication signals SO, SI, and SCLK, and communication selection signals CLCM, CSDR, and CDDR, thereby controlling operations of the respective circuits and the lens.

In synchronism with a synchronization clock signal SCLK, a data signal SO is output from the controller PRS, and a data signal SI is input to the controller PRS.

A lens communication buffer circuit LCM supplies electric power to a lens power supply terminal VL during an operation of the camera. When the selection signal CLCM from the controller PRS is at high-potential level (to be abbreviated as "H" hereinafter, and low-potential level will be abbreviated to as "L" hereinafter), the circuit LCM serves as a communication buffer between the camera and the lens.

When the controller PRS sets the signal CLCM at "H", and outputs predetermined data from a terminal SO in synchronism with the clock signal SCLK, the circuit LCM outputs buffer signals LCK and DCL of the signals SCLK and SO to the lens via camera-lens communication contacts. At the same time, the circuit LCM outputs a buffer signal of a signal DLC from the lens to a terminal SI, and the controller PRS receives data from the lens via the terminal SI in synchronism with the clock signal SCLK.

A driver SDR drives a focus detection line sensor unit SNS comprising, e.g., a CCD. The driver SDR is selected when the signal CSDR is at "H", and is controlled by the controller PRS using the signals SO, SI, and SCLK. A signal CK is a clock for generating CCD driving clocks $\Phi 1$ and $\Phi 2$, and a signal INTEND is a signal for informing the end of an accumulation operation to the controller PRS.

An output signal OS from the sensor unit SNS is a time-serial image signal synchronized with the clocks $\Phi 1$ and $\Phi 2$. After the output signal OS is amplified by an amplifier in the driver SDR, the amplified signal is output as a signal AOS to the controller PRS. The controller PRS receives the signal AOS from an analog input terminal, converts it into a digital signal by the internal A/D conversion function in synchronism with the signal CK, and sequentially stores the digital signal at a predetermined address of the RAM.

An output signal SAGC from the sensor unit SNS is an output from an AGC (Auto Gain Control) sensor in the sensor unit SNS. The output signal SAGC is input to the driver SDR, and is used for accumulation control of the sensor unit SNS.

A photometry sensor SPC for exposure control receives light from an object via a photographing lens. An output SSPC from the sensor SPC is input to an analog input terminal of the controller PRS, and is converted into a digital signal. The digital signal is used in AE control in accordance with a predetermined program.

A switch sense & indication circuit DDR is selected when the signal CDDR is at "H", and is controlled by the controller PRS using the signals SO, SI, and SCLK. More specifically, the circuit DDR switches an indication on a display DSP of the camera on the basis of data sent from the controller PRS, and informs the controller PRS of the ON/OFF states of various operation members of the camera via a communication.

Switches SW1 and SW2 are interlocked with a release button (not shown). The switch SW1 is turned on upon the first stroke of the release button, and the switch SW2 is turned on upon the second stroke of the release button. The controller PRS executes photometry and AF operations when the switch SW1 is turned on, and executes exposure control and a film windup operation in response to an ON signal from the switch SW2 as a trigger signal.

A motor MTR1 is used for a film feed operation, and a motor MTR2 for a mirror up/down operation, and a shutter spring charging operation, and their forward-/reverse rotation control operations are performed by corresponding drivers MDR1 and MDR2. Signals M1F, M1R, M2F, and M2R input from the controller PRS to the drivers MDR1 and MDR2 are motor control signals.

Magnets MG1 and MG2 are used for starting the travel of front and rear curtains of a shutter, and are energized by amplification transistors TR1 and TR2 in response to signals SMG1 and SMG2. Shutter control is performed by the controller PRS.

An auxiliary light source ALED radiates light onto an object when it is determined that the luminance is low, and the object also has a low contrast. When a signal from an output terminal SAL of the controller PRS is set at "H", a driving transistor ART is driven, and auxiliary light is radiated via an optical system ALNS. Note that light is projected to have a given pattern. The light source ALED comprises, e.g., a light-emitting diode.

Since the switch sense & indication circuit DDR, the motor drivers MDR1 and MDR2, and shutter control are not directly related to the present invention, a detailed description thereof will be omitted.

A signal DCL input to a control circuit LPRS in a lens in synchronism with a signal LCK is command data from the camera to a lens FLNS, and a lens operation in response to the command is predetermined. The circuit LPRS analyzes the command in accordance with a predetermined procedure, thereby performing focusing and aperture control operations, and outputting operation conditions of the respective portions of the lens (a driving condition of a focusing optical system, a driving state of a diaphragm, and the like) and various parameters (an open f-number, a focal length, a coefficient of a defocus amount to a moving amount of the focusing optical system, and the like).

This embodiment exemplifies an entirely driven single lens. When a focusing command is sent from the camera, a focusing motor LMTR is driven based on signals LMF and LMR in accordance with driving amount and direction signals sent simultaneously with the command, thereby moving an optical system in an optical axis direction to perform focusing. The moving amount of the optical system is monitored by counting pulse signals SENC from an encoder ENC by an internal counter of the circuit LPRS. Upon completion of a predetermined movement, the circuit LPRS itself sets the signals LFM and LMR at "L", thus braking the motor LMTR.

For this reason, once the focusing command is sent from the camera, the camera controller PRS need not be concerned in a lens driving operation until the lens driving operation is ended. Upon a request from the camera, the content of the counter can be sent to the camera.

When an aperture control command is sent from the camera, a stepping motor DMTR is driven in accordance with an aperture step count signal simultaneously sent with the command. The stepping motor DMTR is one known to those who are skilled in the art as a motor for driving the diaphragm. Since the stepping motor can be subjected to open control, no encoder for monitoring the operation of the motor is required.

The operation of FIG. 1 will be described below with reference to FIGS. 2 to 4C.

When a power switch (not shown) is operated, the microcomputer PRS is powered, and executes an internal program.

Figure 2:
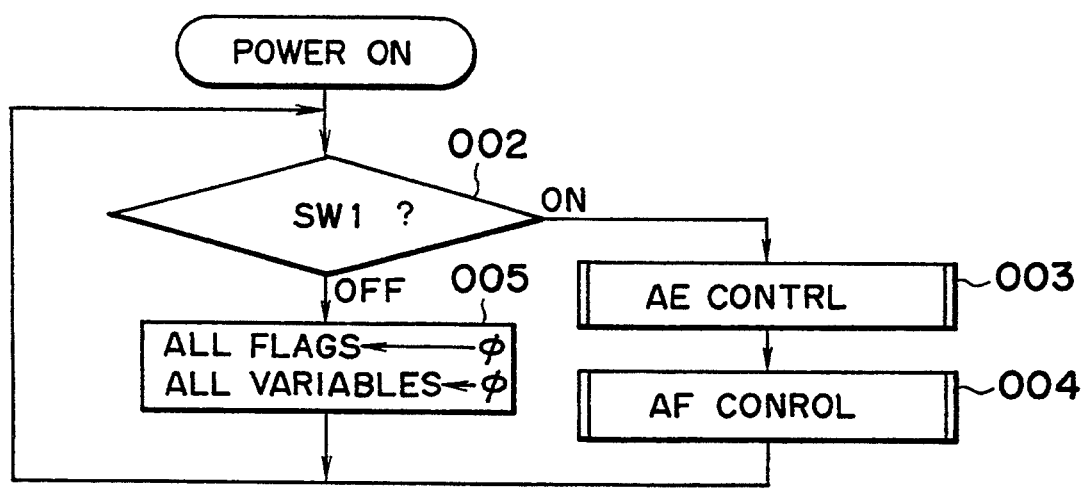

FIG. 2 is a flow chart showing the entire flow of the program. When execution of the internal program is started, a state of the switch SW1 which is turned on upon the first stroke of the shutter (release) button (not shown) is detected in step 002. If the switch SW1 is OFF, all the internal flags of the microcomputer PRS are set to be "0", and all the variables (to be described later) are also set to be "0" in step 005.

Steps 002 and 005 are repetitively executed until the switch SW1 is turned on. When the switch SW1 is turned on, the flow advances to step 003.

In step 003, an AE control subroutine is executed. In the AE control subroutine, photometry calculation processing, exposure control, and a series of control operations for exposure control (such as a shutter charge operation, a film windup operation, and the like) are executed. Since the AE control subroutine is not directly related to the present invention, the summary of this subroutine is as follows (although a detailed description thereof will be omitted). As long as the switch SW1 is ON, every time this AE control subroutine is executed, photometry and exposure control calculations are performed. When the shutter release button is depressed to the second stroke to turn on the switch SW2, a release operation is performed by interrupt processing, and an aperture or a shutter speed is controlled in accordance with an exposure amount calculated in the exposure control calculations. After an exposure operation is completed, a shutter charge operation, and a film feed operation are performed.

Assuming that the release button is depressed to the first stroke, photometry calculation processing is executed in step 003, and the flow then advances to step 004. When a "servo mode" or "manual mode" is selected as an AF operation mode, the above-mentioned interrupt operation is permitted when a first photometry operation is completed after the power switch is turned on. When a "one-shot mode" is selected as the AF operation mode, the interrupt operation is permitted when a just-in-focus state is detected. More specifically, in the "servo mode" or "manual mode", the release operation can always be performed independently of a focusing operation, and in the "one-shot mode", the release operation is permitted only when a just-in-focus state is detected. The AF operation mode is selected by a mode switch (not shown). In the "one-shot mode", once a just-in-focus state is detected, an AF operation is inhibited until the switch SW1 is turned off. In the "servo mode", the AF operation is always performed.

In AF control step 004, a focusing state of a photographing lens is detected. If the "one-shot mode" or "servo mode" is selected, the photographing lens is driven to attain a just-in-focus state. In the "manual mode", only a just-in-focus/defocus indication is performed. In the manual mode, AF control using auxiliary light is disabled.

In the above-mentioned flow, as long as the switch SW1 is ON, AE control in step 003, and AF control in step 004 are repetitively executed.

Figure 3B:
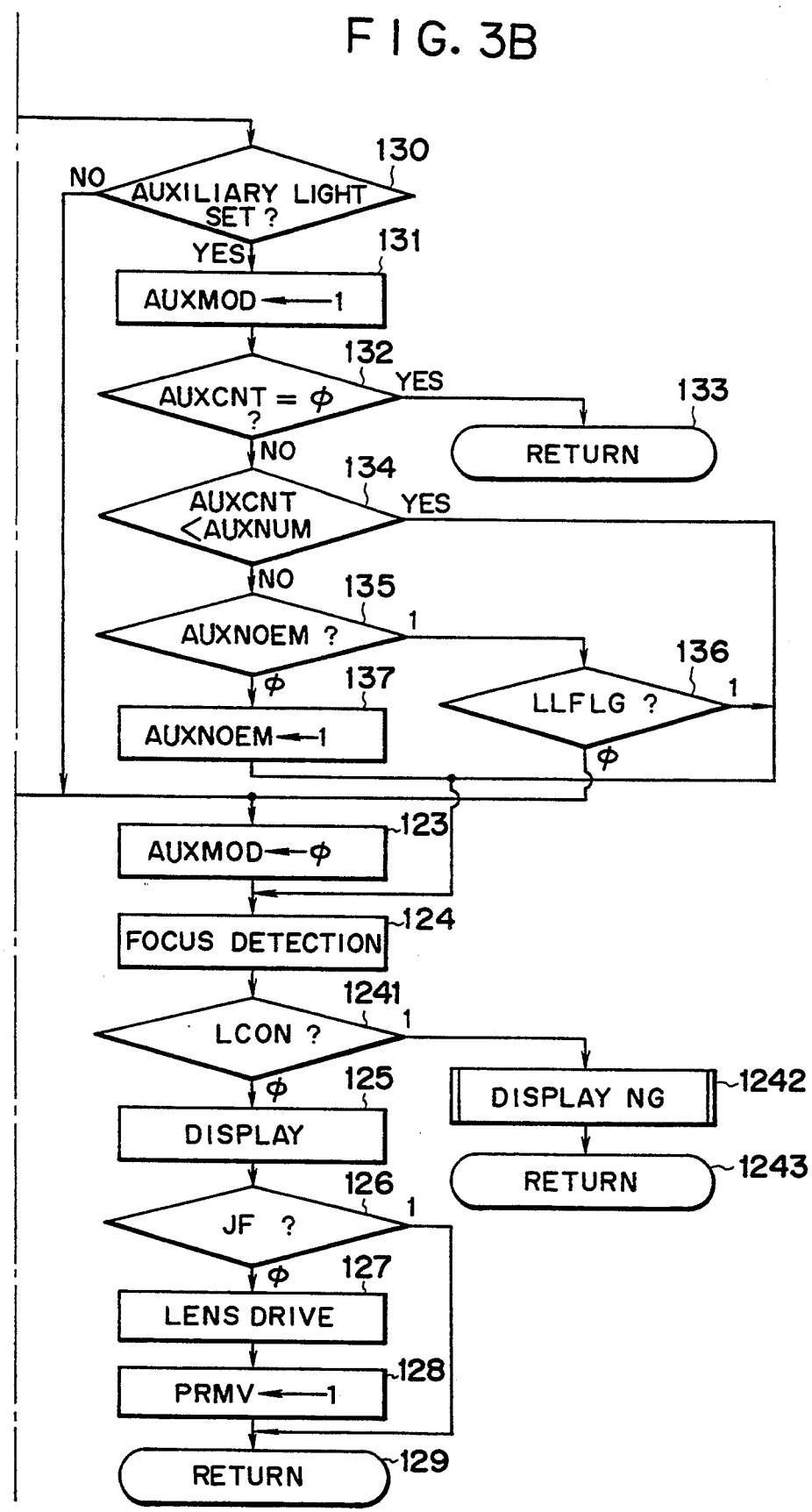

In step 004, an AF control subroutine shown in FIG. 3 is executed.

It is checked in step 102 if first AF control is performed immediately after a photographing operation of one frame is ended (i.e., it is checked if a film feed operation is performed in the AE control subroutine executed immediately before this subroutine), thereby determining whether or not a "continuous photographing mode" is selected. If it is determined that step 102 is executed for the first time after a photographing operation is ended, it is determined that AF control is performed in the continuous photographing mode. In step 103, all the flags in the microcomputer PRS are set to be "0", and all the variables are set to be "0". Thus, in the "continuous photographing mode", previous AF control conditions are initialized. In step 104, a continuous photographing mode flag is set to be "1" to indicate that the AF control is performed in the continuous photographing mode. The flow then advances to step 109. In step 105, a set state of a flag PRMV is checked. The flag PRMV is a "lens driving flag". When no lens driving operation was performed in previous AF control, since the flag PRMV is kept set to be "0", the flow directly jumps to step 109, and AF control is restarted. On the other hand, when the lens driving operation was performed in the previous AF control, it is checked in step 106 if a lens driving operation is stopped.

As described above with reference to FIG. 1, in step 106, the microcomputer PRS communicates with the lens LNS via the lens communication buffer circuit LCM and the control circuit LPRS in the lens, and checks a lens state based on a received monitor signal. If it is determined that the lens is not stopped, since the lens driving operation is being performed, the AF control subroutine is ended. Therefore, as long as the lens is being driven, whether or not the lens is stopped is kept checked in step 106. In this embodiment, AF control is disabled when the lens driving operation is performed, and is enabled when the lens is stopped. Therefore, only when the lens is stopped, the flag PRMV is set to be "0" in step 108, and the flow advances to step 109.

In step 109, an AF mode is checked. If the manual mode is selected, the flow advances to step 110 ("manual" is selected by the mode switch (not shown)). In step 110, an image signal input subroutine is executed, and in steps 111 and 112, focus detection and display subroutines are respectively executed. Thereafter, the AF control subroutine is ended in step 113 (the respective subroutines will be described later).

If it is determined in step 109 that the manual mode is not selected, it is checked in step 114 if the "one-shot mode" is selected. If it is determined that the one-shot mode is selected, the flow advances to step 115 to check (based on a state of a just-in-focus flag JF) if a "just-in-focus state" was attained in a previous operation. If it is determined that the AF control mode is the "one-shot mode", and the just-in-focus state was attained in the previous operation, AF control is ended in step 116. More specifically, in the one-shot mode, once a just-in-focus state is attained, new AF control is disabled until the switch SW1 is turned off. If it is determined in step 115 that the just-in-focus state was not attained in the previous operation, the flow advances to step 117.

In step 117, an image signal input subroutine is executed. In the image signal input subroutine, the microcomputer PRS sets the signal CSDR at "H" to select the driver SDR, and supplies the signal SO to the driver SDR. Since the signal SO at this time is an accumulation start command, the driver SDR supplies a signal CLR to the line sensor unit SNS in accordance with this command to clear image accumulation signals of the CCD line sensors, and thereafter causes the line sensors to perform an image accumulation operation. An optical image is incident on the CCD line sensors $CCD_1$ and $CCD_2$ of the line sensor unit SNS via the photographing lens, and image positions on the sensors $CCD_1$ and $CCD_2$ are determined in accordance with a focusing state. More specifically, in a just-in-focus state with respect to an object, the same image patterns are projected onto the same positions on the sensors $CCD_1$ and $CCD_2$. In a near-focus or far-focus state, image patterns are projected on the sensors $CCD_1$ and $CCD_2$ at symmetrically shifted positions in accordance with a defocus direction and a defocus amount. Therefore, a position shift amount and a shift direction between the image patterns on the sensors $CCD_1$ and $CCD_2$ are detected, thereby detecting a defocus direction and a defocus amount.

As described above, the image patterns projected at positions according to a focus detection state are accumulated on the sensors $CCD_1$ and $CCD_2$ for a predetermined period of time after the image signals are cleared, and thereafter, a signal SH and clocks $\Phi 1$ and $\Phi 2$ are supplied from the driver SDR to the sensor unit SNS. Note that the accumulation time of the image pattern is determined on the basis of the output SAGC from the accumulation control sensor in the sensor unit SNS.

When the signal SH and the clocks $\Phi 1$ and $\Phi 2$ are supplied to the sensor unit SNS, image signals accumulated on the respective pixels of the sensors $CCD_1$ and $CCD_2$ are time-serially output as the output signals OS from the output terminal of the sensor unit SNS, and are amplified by the amplifier in the driver SDR. The amplified signals are sequentially input as the signals AOS to the analog input terminal of the microcomputer PRS. The microcomputer PRS A/D-converts the signals AOS into digital signals by the internal A/D conversion function, and sequentially stores the digital signals at a predetermined address of the RAM.

With the above-mentioned operation, image signals in units of sensors according to the image patterns on the sensors $CCD_1$ and $CCD_2$ are stored as digital values in the RAM.

Figure 4A:
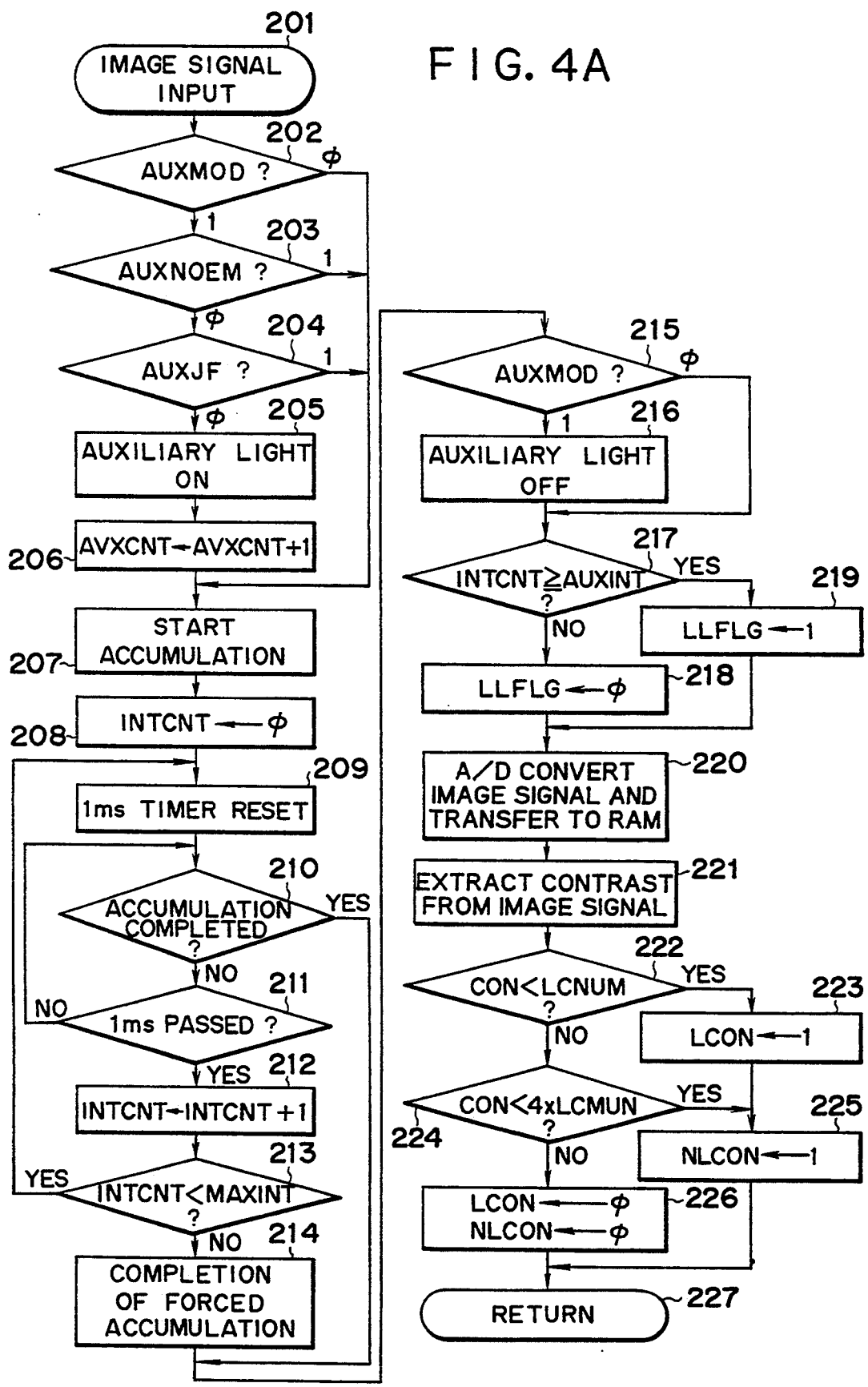

In FIG. 4A, when the image signal input subroutine in step 201 is called from the AF control subroutine, it is checked in step 202 based on a flag AUXMOD (which is set to be "1" when an auxiliary light mode was set in a previous operation) if the "auxiliary light mode" was set in the previous AF control. If it is determined that the auxiliary light mode was not set, the flow jumps to step 207; otherwise, the flow advances to step 203.

It is checked in step 203 based on a flag AUXNOEM (which is set to be "1" when light is projected a predetermined number of times) if the predetermined number of times of the auxiliary light projection operations are completed. If it is determined that the predetermined number of times of the auxiliary light projection operations are completed, the flow jumps to step 207; otherwise, the flow advances to step 204.

In step 204, it is checked based on a flag AUXJF (which is set to be "1" when a just-in-focus state is attained in the auxiliary light mode) if a just-in-focus state was attained in the previous operation under the projection of auxiliary light. If it is determined that the just-in-focus state was attained, the flow jumps to step 207; otherwise, the flow advances to step 205 to turn on auxiliary light.

The flag AUXJF will be described in detail later in the "focus detection" subroutine. The flag AUXJF indicates a judgement result of whether or not a just-in-focus state is attained under the projection of auxiliary light. When AUXJF=1, no auxiliary light is projected even when the flag AUXMOD indicates the auxiliary light mode, and the flag AUXNOEM indicates that the predetermined number of times of the projection operations are not completed.

In step 205, auxiliary light is turned on.

When an output signal from the output terminal SAL of the microcomputer PRS is set to be "1", a current flows through the auxiliary light source ALED via the transistor ATR, and the optical system ALNS starts emission of auxiliary light.

In step 206, a content of an auxiliary light projection counter AUXCNT is incremented by one.

In step 207, the focus detection line sensor unit SNS is caused to start accumulation of an optical image. When the microcomputer PRS sends an "accumulation start command" to the sensor driver SDR, the sensor driver SDR sets the clear signal CLR to photoelectric conversion sections of the sensor unit SNS to be "0", thereby starting accumulation of electric charges.

In step 208, an accumulation time counter INTCNT is initialized to an initial value "0".

In step 209, a 1-ms sec timer counter of an accumulation time timer is reset. The counter is realized by a timer function of the microcomputer PRS.

In step 210, it is checked if the sensor completed accumulation. In this case, whether or not the signal INTEND from the sensor driver SDR is "1" is checked. The sensor driver SDR sets the signal INTEND to be "0" simultaneously with the beginning of accumulation of the line sensor unit SNS, and monitors an output signal SAGC from the accumulation control sensor from the sensor unit SNS. When the signal SAGC reaches a predetermined level, the signal INTEND from the sensor driver SDR is set to be "1", and at the same time, a charge transfer signal SH from the sensor driver SDR is set at "H" for a predetermined period of time, thereby transferring a charge in the photoelectric conversion sections to the CCD sections.

If it is determined in step 210 that the accumulation is completed, the flow advances to step 215; otherwise, the flow advances to step 211.

In step 211, it is checked if the 1-ms timer has reached the accumulation time 1 ms. If the timer has not reached 1 ms yet, the flow returns to step 210; otherwise, the counter INTCNT is incremented by one in step 212.

In step 213, the content of the counter INTCNT is compared with a predetermined value MAXINT. The value MAXINT is a maximum accumulation time expressed in units of 1 ms. If it is determined that the content of the counter INTCNT is smaller than MAXINT, the flow returns to step 209 to wait for the end of accumulation. If it is determined that the content of the counter INTCNT coincides with the maximum accumulation time MAXINT, accumulation is forcibly ended in step 214.

In this case, the accumulation is completed by sending an "accumulation end command" from the microcomputer PRS to the sensor driver SDR. Upon reception of the "accumulation end command" from the microcomputer PRS, the sensor driver SDR sets the charge transfer signal SH at "H" for a predetermined period of time, thus transferring a charge in the photoelectric conversion sections to the CCD sections.

In step 215, it is checked based on the flag AUXMOD if the auxiliary light mode is selected. If the auxiliary light mode is selected, auxiliary light is turned off in step 216. More specifically, a signal at the output terminal SAL of the microcomputer PRS is set to be "0" to disable an operation of the auxiliary light source ALED. Even when step 216 is executed when the auxiliary light mode is not selected, no adverse influence occurs. Therefore, step 215 may be omitted.

In step 217, the content of the accumulation time counter INTCNT is compared with a predetermined constant AUXINT. The constant AUXINT is a low-luminance accumulation time expressed in correspondence with the accumulation time. If INTCNT≧AUXINT, a low-luminance flag LLFLG is set to be "1" in step 219; otherwise, the flag LLFLG is set to be "0".

In step 220, the signals AOS obtained by amplifying the image signals OS from the line sensor unit SNS in the driver SDR are A/D-converted, and digital signals are stored at a predetermined address of the RAM in the microcomputer PRS.

In step 221, contrast data of the image signals stored at the predetermined address of the RAM in step 220 is extracted, and is stored in a counter CON.

In step 222, the content of the contrast counter CON is compared with a predetermined value LCNUM. If the content of the counter CON is smaller than LCNUM, it is determined that the current image signals are in a low-contrast state in which focus detection is disabled, and the flow advances to step 223. In step 223, "1" is set in a flag LCON indicating the low-luminance state.

In step 224, the content of the contrast counter CON is compared with 4×the predetermined value LCNUM. In this case, it is determined if the contrast of the current image signal is relatively low. In this embodiment, 4×low-contrast determination threshold value is used as a value to be compared. If the content of the counter CON is smaller than 4×the predetermined value LCNUM, the flow advances to step 225 to set "1" in a flag NLCON indicating a contrast state for recommending use of the auxiliary light source. Thereafter, the flow advances to step 227. Note that this flag is also set when the content of the counter CON is smaller than LCNUM.

In step 226, it is determined that the contrast of the current image signals is sufficient for focus detection with high precision, and the flags LCON and NLCON are respectively set to be "0". Thereafter, the flow returns from step 227 to the main routine, i.e., step 118.

In step 118, it is checked based on a flag FAF if a continuous photographing mode is selected.

If the flag FAF is "1", i.e., if the continuous photographing mode is selected, the flow jumps to step 123; otherwise, the flow advances to step 119. Step 119 and subsequent steps show a flow associated with auxiliary light. If the flag FAF is "1", the flow jumps to step 123 so as not to execute processing associated with auxiliary light in the continuous photographing mode.

In step 119, it is checked based on the flag AUXMOD if the auxiliary light mode is selected.

If the auxiliary light mode was selected in the previous AF control, since the flag AUXMOD is "1", the flow jumps to step 130. If the flag AUXMOD is "0", the flow advances to step 120, and it is checked based on the flag LLFLG if the luminance is low. The flag LLFLG is set in the "image signal input" subroutine described above. If the flag LLFLG is "1", i.e., the luminance is low, the flow advances to step 121; otherwise, the flow advances to step 123.

In step 121, it is checked based on the flag LCON set in the "image signal input" subroutine described above if focus detection is possible. If the flag LCON is "1", since the current image signals have a low luminance and a low contrast, the flow advances to step 130 to execute a focus detection operation using the auxiliary light source; otherwise, it is similarly checked based on the flag NLCON in step 122 if the auxiliary light source should be used in the current contrast state. If the flag NLCON is "1", since the luminance is low, and the contrast is also relatively low, the flow advances to step 130 to execute a focus detection operation using the auxiliary light source. If the flag NLCON is "0", the flow advances to step 123.

Steps 130 to 137 show an auxiliary light control flow executed when both the luminance and contrast are low.

In step 130, it is checked if an auxiliary light unit is attached to the camera. This checking step is attained by detecting a state of a switch (not shown) which is turned on when the auxiliary light unit is attached to the camera.

If the auxiliary light unit is not attached, the flow advances to step 123, and "0" is set in the flag AUXMOD to cancel the auxiliary light mode.

If the auxiliary light unit is attached, "1" is set in the flag AUXMOD in step 131 to set the auxiliary light mode. Step 131 is executed when it is determined in step 119 that the flag AUXMOD indicates the auxiliary light mode. In this case, step 131 is executed due to the program sequence of the present invention.

In step 132, it is checked if the counter AUXCNT is set to be "0". The counter AUXCNT is a variable counted in step 206 in the "image signal input" subroutine described above, and its content is incremented by one when image signals are accumulated on the photoelectric conversion elements under the projection of auxiliary light. This counter AUXCNT is cleared in step 005 in the flow chart shown in FIG. 2 when the switch SW1 is OFF. In the AF control in the continuous photographing mode, the counter AUXCNT is cleared in step 103 in the flow chart shown in FIG. 3.

Therefore, the counter AUXCNT="0" indicates that the auxiliary light mode is set for the first time in the sequence. If the first auxiliary light mode is set, the flow advances to step 133, and AF control using the currently input image signals is ended.

More specifically, the image signals input in step 117 are abandoned, and new image signals are input under the projection of auxiliary light in the next AF control. Therefore, it can be regarded that the image signals input in step 117 are used only for judging a luminance.

On the other hand, if it is determined that the counter AUXCNT is not "0", since the auxiliary light mode has already been set, the content of the counter AUXCNT is compared with a predetermined constant AUXNUM in step 134. The constant AUXNUM represents a projection limit count of auxiliary light. If the content of the counter AUXCNT is smaller than the projection limit count AUXNUM, the flow advances to step 124, and a "focus detection" subroutine is executed. If the content of the counter AUXCNT satisfies AUXCNT-≧AUXNUM (note that AUXCNT>AUXNUM does not occur in an actual sequence), the flow advances to step 135.

In step 135, it is checked based on the flag AUXNOEM if a predetermined number of times of light projection operations are completed. If it is determined based on the flag AUXNOEM that the number of times of auxiliary light projection operations has already reached the predetermined constant AUXNUM, a predetermined number of times of light projection operations are completed, and the following projection of auxiliary light is inhibited. More specifically, even if the flag AUXMOD is "1", i.e., indicates the auxiliary light mode in the "image signal input" subroutine described above, if the flag AUXNOEM is "1" and indicates that a predetermined number of times of auxiliary light projection operations are completed, no auxiliary light is projected in an image signal accumulation operation.

If it is determined based on the flag AUXNOEM in step 135 that a predetermined number of times of projection operations are completed, the flow advances to step 136.

In step 136, it is checked based on the flag LLFLG if the luminance is low.

The flag LLFLG is the low-luminance flag set in the "image signal input" subroutine described above. To judge the luminance based on the flag LLFLG in a state wherein the flag AUXNOEM indicates that a predetermined number of times of projection operations are completed is to judge the luminance in a "state wherein no light is projected since auxiliary light has already been projected a predetermined number of times in the auxiliary light mode". If the flag LLFLG does not indicate a low luminance, the flow advances to step 123 to set "0" in the flag AUXMOD to cancel the auxiliary light mode, and the flow then advances to step 124. In this case, if it is determined based on the flag LLFLG that the luminance is not low, i.e., if the luminance is increased in the above-mentioned state, the auxiliary light mode is canceled, and a normal mode is set again. Thus, AF control in the normal mode is restarted.

The flow advances to step 123 when it is determined in step 118 that the flag FAF is "1", i.e., indicates that the continuous photographing mode is set (without projection of auxiliary light), and when it is determined in step 120 that the flag LLFLG is "0", i.e., indicates that the luminance is not low if it is determined in step 119 that the flag AUXMOD does not indicate the auxiliary light mode. More specifically, the flow advances to step 123 when the AF control is not set in the auxiliary mode, and when the object luminance is not low.

If the flag LLFLG is "1", i.e., indicates that the luminance is low, the flow advances to step 124 to execute the "focus detection" subroutine.

In the above-mentioned flow, only when the flag AUXNOEM indicates that the predetermined number of times of auxiliary light projection operations are completed in step 135, whether or not the luminance is low is judged based on the flag LLFLG for the following reason. That is, when the luminance of an object is detected under the projection of auxiliary light, the object luminance is increased due to the influence of the auxiliary light, and a true object luminance cannot be determined. Therefore, when the flag AUXNOEM indicates that the number of times of auxiliary light projection operations is equal to or smaller than a predetermined count, the determination of whether or not the luminance is low is inhibited.

Figure 4B:
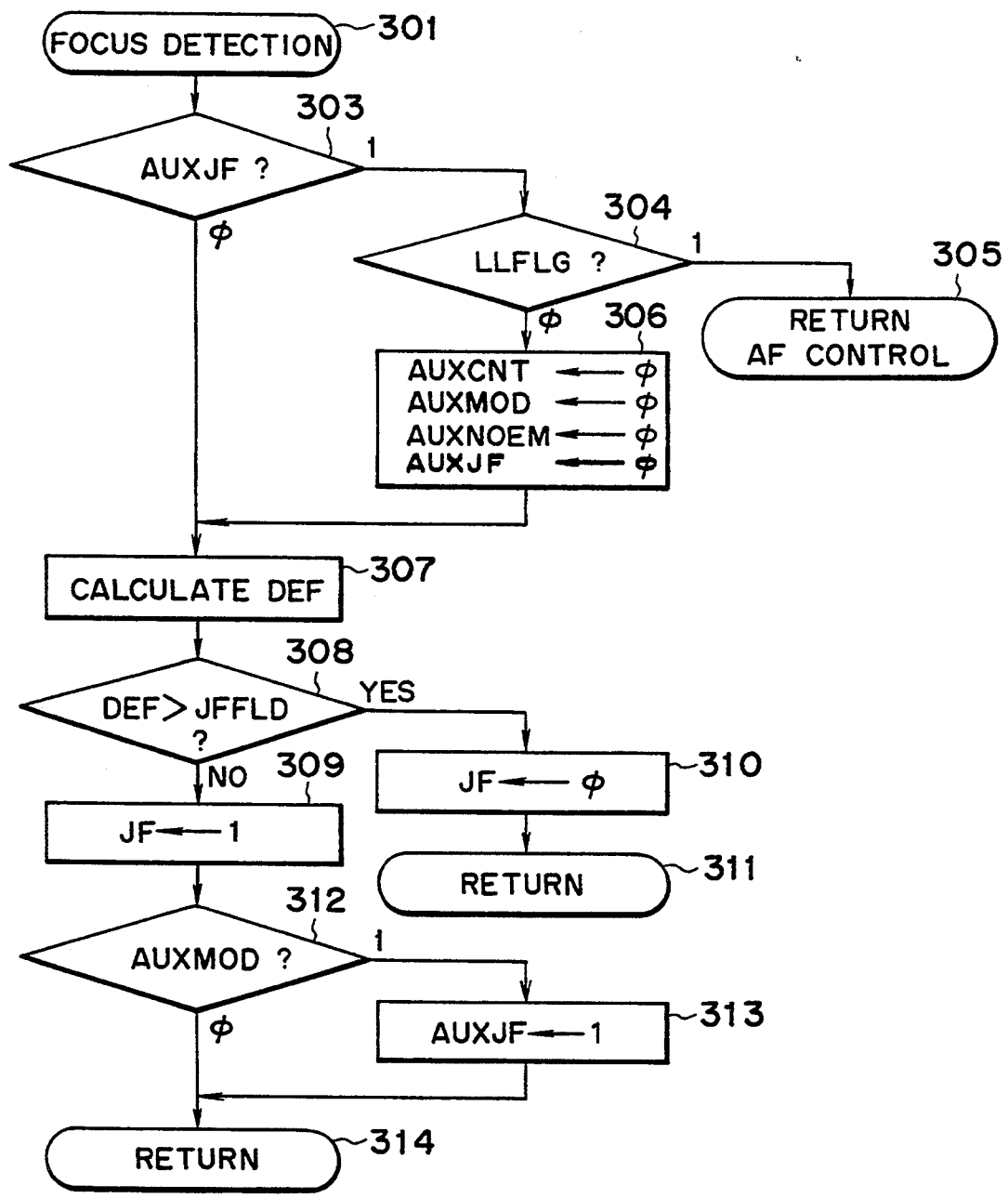

The focus detection subroutine in step 124 will be described below with reference to FIG. 4B.

In step 303, it is checked based on the flag AUXJF if a just-in-focus state was previously attained under the projection of auxiliary light. If it is determined that the just-in-focus state was previously attained under the projection of auxiliary light, the flow advances to step 304.

In step 304, the state of the flag LLFLG is detected to check if the luminance in a state without projection of auxiliary light is low. If the flag LLFLG is "1" and indicates a low luminance, AF control is ended in step 305. On the other hand, if the flag LLFLG is "0" and does not indicate a low luminance, it is determined that the object luminance is increased. Therefore, the flow advances to step 306 to clear the auxiliary mode flag AUXMOD, the projection count end flag AUXNOEM, and the just-in-focus flag AUXJF to "0". In addition, the auxiliary light counter flag AUXCNT is cleared to "0".

Operations in steps 303 to 306 will be described in more detail below. When the flag AUXJF is "1", i.e., indicates that a just-in-focus state was previously attained under the projection of auxiliary light, this means that the current image signals are those obtained without projection of auxiliary light. More specifically, if it is determined in step 204 in the "image signal input" subroutine described above that the flag AUXJF is "1" and indicates that a just-in-focus state was previously attained under the projection of auxiliary light, the auxiliary light is 1 inhibited from being turned on. Therefore, the flag LLFLG judged in step 304 indicates a luminance judgment result without projection of auxiliary light. If this flag LLFLG is "1", and indicates a low luminance, this means that although a just-in-focus state could be attained under the projection of auxiliary light, a luminance measured after the just-in-focus state is still low. In this state, i.e., when the luminance is low after the just-in-focus state under the projection of auxiliary light, AF control is disabled, and the just-in-focus state is held in step 305. In this case, the same operation as in the AF control one-shot mode is performed.

On the other hand, if the flag LLFLG is "0", i.e., indicates that the luminance is not low, this means that the luminance which is measured without projection of auxiliary light after a just-in-focus state was attained under the projection of auxiliary light is not low. Therefore, in step 306, the flags and the counter associated with auxiliary light are cleared to restart AF control.

As described above, when the auxiliary light mode is selected, the camera is operated in the one-shot mode regardless of whether the AF control mode is operated in the one-shot mode or the servo mode. In this case, when the object luminance is low, the one-shot mode is continued, as described above. However, when the object luminance is changed due to a surrounding condition, and is not low, if the servo mode is selected as the AF control mode, AF control in the servo mode is restarted, as described above, and the flow advances to step 307.

In step 307, a defocus amount DEF of the photographing lens is calculated based on the image signals obtained in the above-mentioned "image signal input" subroutine.

In this case, a shift amount and a shift direction to a just-in-focus state are calculated as the defocus amount DEF on the basis of digital values according to the image patterns on the sensors $CCD_1$ and $CCD_2$ obtained in the above-mentioned "image signal input" subroutine. Since a detailed calculation method of the defocus amount is not directly associated with the object of the present application, a detailed description thereof will be omitted. In this case, since a degree of coincidence between the image patterns on the sensors $CCD_1$ and $CCD_2$ is determined according to a just-in-focus state, digital values from the sensors corresponding to the patterns are compared to obtain a degree of coincidence between two data, thereby obtaining a shift amount and a shift direction from a just-in-focus state, i.e., the defocus amount DEF.

In step 308, the defocus amount (DEF) is compared with a predetermined value JFFLD.

If DEF>JFFLD, the flow advances to step 310, and the just-in-focus flag JF is set to be "0" to end the focus detection subroutine. The flow then advances to step 124.1 in FIG. 3.

On the other hand, if it is determined that JFFLD DEF, the just-in-focus flag JF is set to be "1" in step 309, and the flow advances to step 312. Note that the value JFFLD indicates a predetermined just-in-focus width.

In step 312, it is checked based on the flag AUXMOD if the auxiliary light mode is selected.

If the flag AUXMOD indicates the auxiliary light mode, the flag AUXJF is set to be "1" since the just-in-focus state is attained under the projection of auxiliary light in step 313. Thereafter, the focus detection subroutine is ended, and the flow advances to step 1241. In step 1241, the flag LCON is checked. If the flag LCON is "1", it is determined that focus detection is impossible, and the flow advances to step 1242 to execute an "NG display" subroutine. This subroutine is a function of displaying that focus detection is impossible using a display member, and a detailed description thereof will be omitted. After the "NG display" subroutine is executed, the flow advances to step 1243, and the "AF control" subroutine is returned.

If it is determined in step 1241 that the flag LCON is "0", it is determined that focus detection is possible, and the flow advances to step 125 in FIG. 3 to execute a "display" subroutine.

In the "display" subroutine in step 125, whether or not a just-in-focus state in the AF control is attained is merely displayed by a display member, and a detailed description thereof will be omitted.

In step 126, it is checked (based on the flag JF) if a just-in-focus state is attained.

The flag JF is stored in the "focus detection" subroutine described above. When the flag JF indicates the just-in-focus state, the AF control is ended in step 129; otherwise, the flow advances to step 127, and a lens driving subroutine is executed.

In the lens driving subroutine, the microcomputer PRS sets the signal CLCM to be "1" to designate the buffer circuit LCM.

A lens driving amount is supplied as a signal SO to the circuit LCM, and the signal SO is supplied as a signal DCL to the control circuit LPRS. The circuit LPRS sets a signal LMF or LMR at "H" in accordance with a lens driving amount to rotate the motor LMTR in a predetermined direction, thereby moving the photographing lens LNS in the optical axis direction. The lens moving amount is monitored by the encoder ENC. The encoder ENC outputs a signal SENC according to the moving amount. The signal SENC is compared with a signal representing the defocus amount described above input to the circuit LPRS, and when the two signals coincide with each other, the signal LMF or LMR is set at "L". Thus, the rotation of the motor LMTR is stopped, and the lens driving operation is ended.

With the above-mentioned operation, the lens is moved by an amount according to the defocus amount, and the lens driving subroutine is ended. In step 128, "1" is set in a lens driving flag PRMV, and AF control is ended in step 129.

Figure 4C:
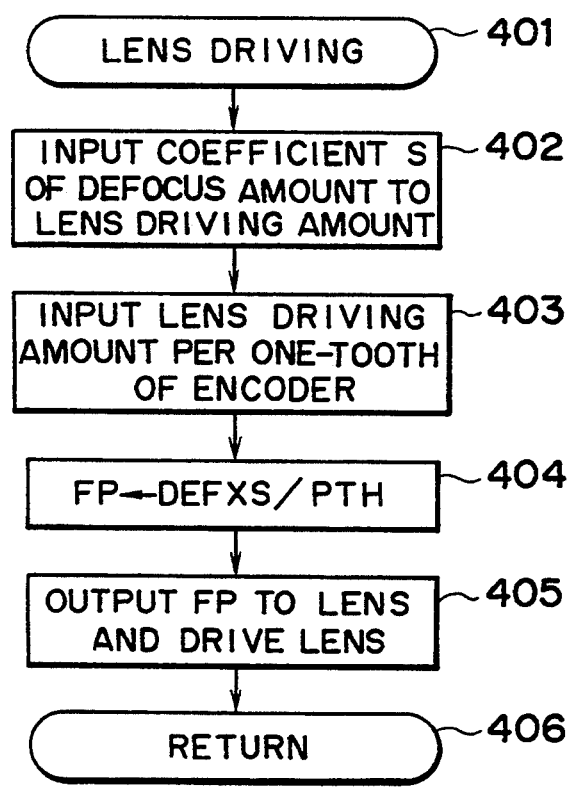

The lens driving subroutine in step 401 in FIG. 4C will be described in detail below.

In step 402, a "coefficient S of a defocus amount to a lens driving amount" is input from the photographing lens. The defocus amount is the above-mentioned amount DEF, and the driving amount represents a moving amount of the focusing lens in the optical axis direction.

The coefficient S is S=1 when the photographing lens is the entirely driven single focal point lens, and is changed in accordance with a zooming position when the photographing lens is a zooming lens.

In step 403, a "driving amount PTH per tooth of the encoder" is input. When the focusing lens is moved, the encoder generates pulses according to this movement. In this case, the driving amount PTH per tooth of the encoder represents a moving amount of the lens per tooth.

In step 404, an integral value FP obtained by expressing a moving amount of the focusing lens by the number of teeth based on the detected defocus amount DEF, the coefficient S of the defocus amount to the driving amount, and the driving amount PTH per tooth of the encoder is calculated using the following equation:

$$FP = DEF \times S/PTH$$

In step 405, the integral value FP calculated in step 404 is set to the photographing lens as the lens driving amount, thereby driving the lens. In step 406, the lens driving subroutine is ended.

The operation of the present invention with the above arrangement can be summarized as follows.

When both luminance and contrast are low:

In this case, when the image signal input subroutine is executed in step 117, the flags LLFLG, LCON, and NLCON are set to be "1". Thus, upon execution of the AF control subroutine (FIG. 3), steps 130, 131, and 132, and 133 are executed. When the image input subroutine is executed again in step 117, step 205 is executed, and an image signal accumulation operation is executed under the projection of auxiliary light.

When luminance is low, and contrast is relatively low:

In this case, when the image signal input subroutine is executed in step 117, the flags LLFLG and LCON are set to be "1", and the flag NLCON is set to be "0". Therefore, in this case, an image signal accumulation operation is executed under the projection of auxiliary light like in the low-luminance, low-contrast state.

Therefore, focus detection precision can be improved as compared to a conventional apparatus which performs focus detection without projection of auxiliary light when the contrast is relatively low.

On the other hand, focus detection impossible judgment in step 124.1 is made with reference not to a relatively low contrast level as an auxiliary light projection determination level, but to a low contrast level. As described above, when the contrast state falls within a range between the low contrast level and the relatively low contrast level, the focusing operation can be reliably executed. In this embodiment, an LED is used as the auxiliary light source. However, a flash tube or an electric bulb may be used. In the above embodiment, defocus amount detection is performed. However, a focus detection apparatus which obtains an object distance based on a sensor output may be used instead.

In the above embodiment, whether or not light projection and focusing are to be performed are judged in accordance with a contrast state. However, the above-mentioned judgment may be performed using a characteristic value representing possibility of focus detection other than the contrast state.

What is claimed is:

1. An auto-focus apparatus which includes a light-receiving sensor for receiving light from an object, and which performs a focusing operation on the basis of an output from said sensor, comprising:
   a processing circuit for executing signal processing on the basis of the output from said sensor, said processing circuit outputting an instruction signal for operating a light projection means when a characteristic value for focusing, based on the output from said sensor in a state without light protection by the light projection means, falls within a first range, said processing circuit detecting the output from said sensor in a light projection state by said light projection means, and inhibiting the focusing operation based on the output from said sensor when the characteristic value falls within a second range which is within the first range, said first range having a predetermined value which is different than a predetermined value of said second range.

2. An apparatus according to claim 1, wherein the characteristic value is a value associated with a contrast, and wherein said processing circuit outputs the instruction signal when the characteristic value associated with the contrast is lower than a first limit value, and inhibits the focusing operation when the characteristic value based on the output from said sensor in the light projection state by said light projection means is lower than a second limit value lower than the first limit value.

3. An apparatus according to claim 2, wherein said processing circuit outputs the instruction signal when a luminance signal based on the output from said sensor is lower than a predetermined level, and the characteristic value is lower than the first limit value.

4. An auto-focus apparatus which includes a light-receiving sensor for receiving light from an object, and which performs a focusing operation on the basis of an output from said sensor, comprising:
   a) an arithmetic circuit for calculating a characteristic value relating to a contrast on the basis of the output from said sensor;
   b) an instruction signal forming circuit for, when the characteristic value indicates a contrast state lower than a predetermined first contrast value, forming an instruction signal for driving a projection means;
   c) an inhibit signal forming circuit for outputting an inhibit signal, when the characteristic value, calculated by said arithmetic means on the basis of the output from said sensor in a light projection state by said light projection means, indicates a contrast state lower than a second contrast value indicating a contrast state lower than the first contrast value, said second contrast value being different from said first contrast value; and
   d) an inhibit circuit for inhibiting a focusing operation based on the output from said sensor in response to the inhibit signal.

5. An apparatus according to claim 4, wherein the second contrast value is a contrast value at which focus detection is impossible.

6. An apparatus according to claim 4, wherein said instruction signal forming circuit comprises a judgment circuit for judging a luminance state on the basis of the output from said sensor, and forms the instruction signal when said judgment circuit indicates that a luminance level is equal to or lower than a predetermined value, and the characteristic value is lower than the first contrast value.

7. An apparatus according to claim 4, wherein said light-receiving sensor comprises first and second sensor sections for receiving light from an object via a focusing optical system, and a detection circuit for detecting a focusing state in accordance with a luminance distribution state of incident light on said sensor sections, and a focusing operation is performed on the basis of the focusing state detected by said detection circuit.

8. A camera system having an auto-focus apparatus which includes a light-receiving sensor for receiving light from an object, and which performs a focusing operation on the basis of an output from said sensor, comprising:
   a) an arithmetic circuit for obtaining a characteristic value representing a possibility of focus detection in accordance with the output from said sensor;
   b) projection means which is driven when the characteristic value indicates a state inferior to a predetermined first possibility level; and
   c) an inhibit circuit for inhibiting the focusing operation based on the output from said sensor, when a characteristic value, obtained by said arithmetic circuit on the basis of the output from said sensor in a state wherein light is projected from said projection means, indicates a state inferior to a second possibility level which is inferior to the first possibility level, said second possibility level being different from said first possibility level.

9. A system according to claim 8, wherein the characteristic value is a value representing a contrast.

10. A system according to claim 9, wherein the second possibility level is a contrast value at which focus detection is impossible.

11. A system according to claim 10, further comprising a judgment circuit for judging a luminance state on the basis of the output from said sensor, and a projection driving circuit for, when said judgment circuit judges that a luminance level is equal to or lower than a predetermined value, and it is determined that the characteristic value indicates a state inferior to the first possibility level, driving said projection means.

12. A system according to claim 9, further comprising an alarm circuit for, when the characteristic value obtained by said arithmetic circuit indicates a state inferior to the second possibility level, performing an alarm display.

13. A system according to claim 8, further comprising a first control circuit for, when the characteristic value obtained by said arithmetic circuit on the basis of the output from said sensor in a non-projection state by said projection means indicates a state superior to the first possibility level, permitting the focusing operation based on the output from said sensor, and for, when the characteristic value indicates a state inferior to the first possibility level, inhibiting the focusing operation based on the output from said sensor.

14. A system according to claim 13, further comprising a second control circuit for, when the characteristic value obtained by said arithmetic circuit on the basis of the output from said sensor in a projection state by said projection means indicates a state superior to the second possibility level, permitting the focusing operation based on the output from said sensor.

15. An auto-focus apparatus which includes a light-receiving sensor for receiving light from an object and which performs a focusing operation on the basis of an output from said sensor, comprising:
   an arithmetic circuit for calculating a characteristic value for focus on the basis of the output from said sensor;
   a judgement circuit for performing a first judgement for determining whether said focusing operation based on said sensor output is to be performed, based on the characteristic value which is calculated by said arithmetic circuit for the sensor output obtained under a condition that no light beam is projected, and for performing a second judgement for determining whether said focusing operation based on said sensor output is to be performed, based on the characteristic value which is calculated by said arithmetic circuit for the sensor output obtained under a condition that the light beam is projected; and
   a setting circuit for setting a reference value of said first judgement to be different than a reference value of said second judgement, the reference value representing a possibility, and a possibility represented by the reference value of the first judgement is set higher than a possibility represented by the reference value of the second judgement.

16. An apparatus according to claim 15, wherein said characteristic value represents contrast.

17. A camera having an auto-focus apparatus which includes a light-receiving sensor for receiving light from an object and which performs a focusing operation on the basis of an output from said sensor, comprising:
an arithmetic circuit for calculating a characteristic value for focus on the basis of the output from said sensor;
a judgement circuit for performing a first judgement for determining whether said focusing operation based on said sensor output is to be performed based on the characteristic value which is calculated by said arithmetic circuit for the sensor output obtained under a condition that no light beam is projected, and for performing a second judgement for determining whether said focusing operation based on said sensor output is to be performed based on the characteristic value which is calculated by said arithmetic circuit for the sensor output obtained under a condition that the light beam is projected; and
a setting circuit for setting a reference value of said first judgement to be different than a reference value of said second judgement, the reference value representing a possibility, and a possibility represented by the reference value of the first judgement is set higher than a possibility represented by the reference value of the second judgement.

18. A camera according to claim 17, wherein said characteristic value represents contrast.

* * * * *

UNITED STATES PATENT AND TRADEMARK OFFICE
CERTIFICATE OF CORRECTION

PATENT NO. 5,382,996

DATED  January 17, 1995

INVENTOR(S) KADOHARA

It is certified that error appears in the above-indentified patent and that said Letters Patent is hereby corrected as shown below: Title page,

At [56] References Cited

"5,148,211  9/1990  Kotani et al." should read
--5,148,211  9/1992  Kotani et al."--.

Column 2

Line 45, "to" should be deleted.
Line 63, "clocks $\Phi 1$ and $\Phi 2$," should read --clocks $\phi$ and $\phi 2$.--
Line 68, $\Phi 1$ and $\Phi 2$," should read --$\phi 1$ and $\phi 2$.--

Column 6

Line 54, "clocks $\Phi 1$ and $\Phi 2$," should read --clocks $\phi 1$ and $\phi 2$.--
Line 59, clocks $\Phi 1$ and $\Phi 2$," should read --clocks $\phi 1$ and $\phi 2$.--

UNITED STATES PATENT AND TRADEMARK OFFICE
CERTIFICATE OF CORRECTION

PATENT NO. : 5,382,996
DATED : January 17, 1995
INVENTOR(S) : Kodohara

It is certified that error appears in the above-indentified patent and that said Letters Patent is hereby corrected as shown below:

Column 11

Line 59, "1" should be deleted.

Column 12

Line 46, "124.1" should read --1241--.
Line 47, "JFFLD" should read --JFFLD>--.

Signed and Sealed this

Eighteenth Day of April, 1995

Attest:

BRUCE LEHMAN

Attesting Officer

Commissioner of Patents and Trademarks